United States Patent [19]
Wolter

[11] 3,831,699
[45] Aug. 27, 1974

[54] SHUNTING TRACTOR WITH SWIVEL SEAT AND AUTOMATIC REAR DOOR OPENER

[75] Inventor: Karl Reinhold Wolter, Mississauga, Ontario, Canada

[73] Assignee: Levy-Russell Limited, Toronto, Ontario, Canada

[22] Filed: July 25, 1973

[21] Appl. No.: 382,353

[30] Foreign Application Priority Data
July 27, 1972  Canada .............................. 148077

[52] U.S. Cl. .............................. 180/77 S, 296/65 R
[51] Int. Cl. ............................................ B62d 53/08
[58] Field of Search .......... 180/77 S, 49, 85 R, 111, 180/112, 113; 296/65 R, 68, 28 C

[56] References Cited
UNITED STATES PATENTS
2,992,852  7/1961  Loofbourrow et al. ................ 296/68
3,254,900  6/1966  Allen ................................. 180/77 S OTHER PUBLICATIONS
Popular Science, April 1958, p. 258.

Primary Examiner—Robert B. Reeves
Assistant Examiner—Thomas E. Kocovsky

[57] ABSTRACT

A shunting tractor is provided for moving road trailers. The tractor has a driving cap coupled to a chassis adjacent the front of the tractor and a fifth wheel is coupled to the chassis behind the cab by an adjustable support which is operable to raise and lower the fifth wheel for lifting the front of a road trailer. A swivel seat is mounted in the cab for rotation between a forward-facing first position and a rearward-facing second position and a cab door which is located at the rear of the cab adjacent a platform, is operably coupled to the seat. On moving the seat from the first to the second position the door opens to provide an operator with ready access onto the platform for coupling air services and the like to a trailer. The door returns to closed position upon returning the seat to the first position.

13 Claims, 7 Drawing Figures

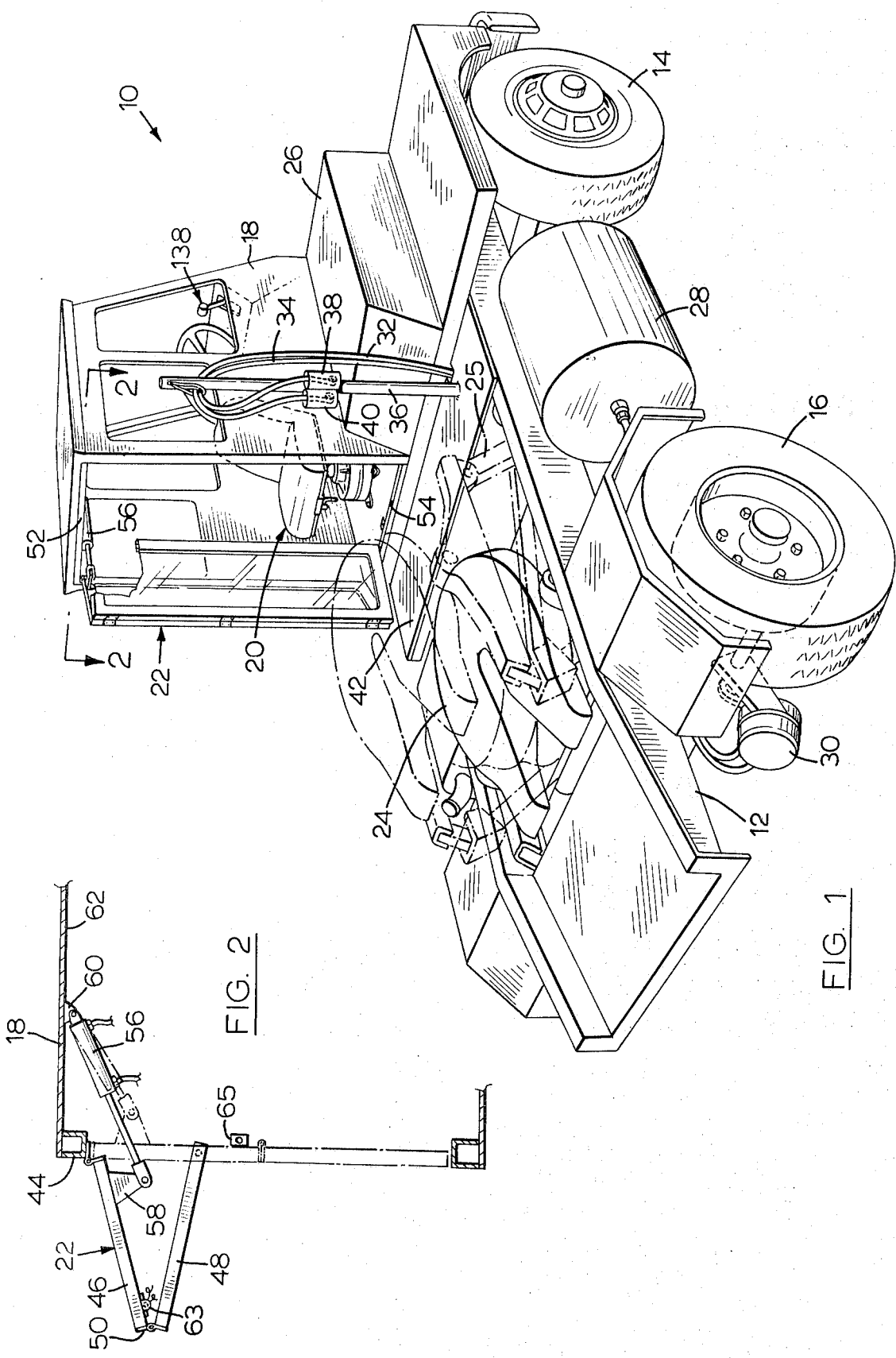

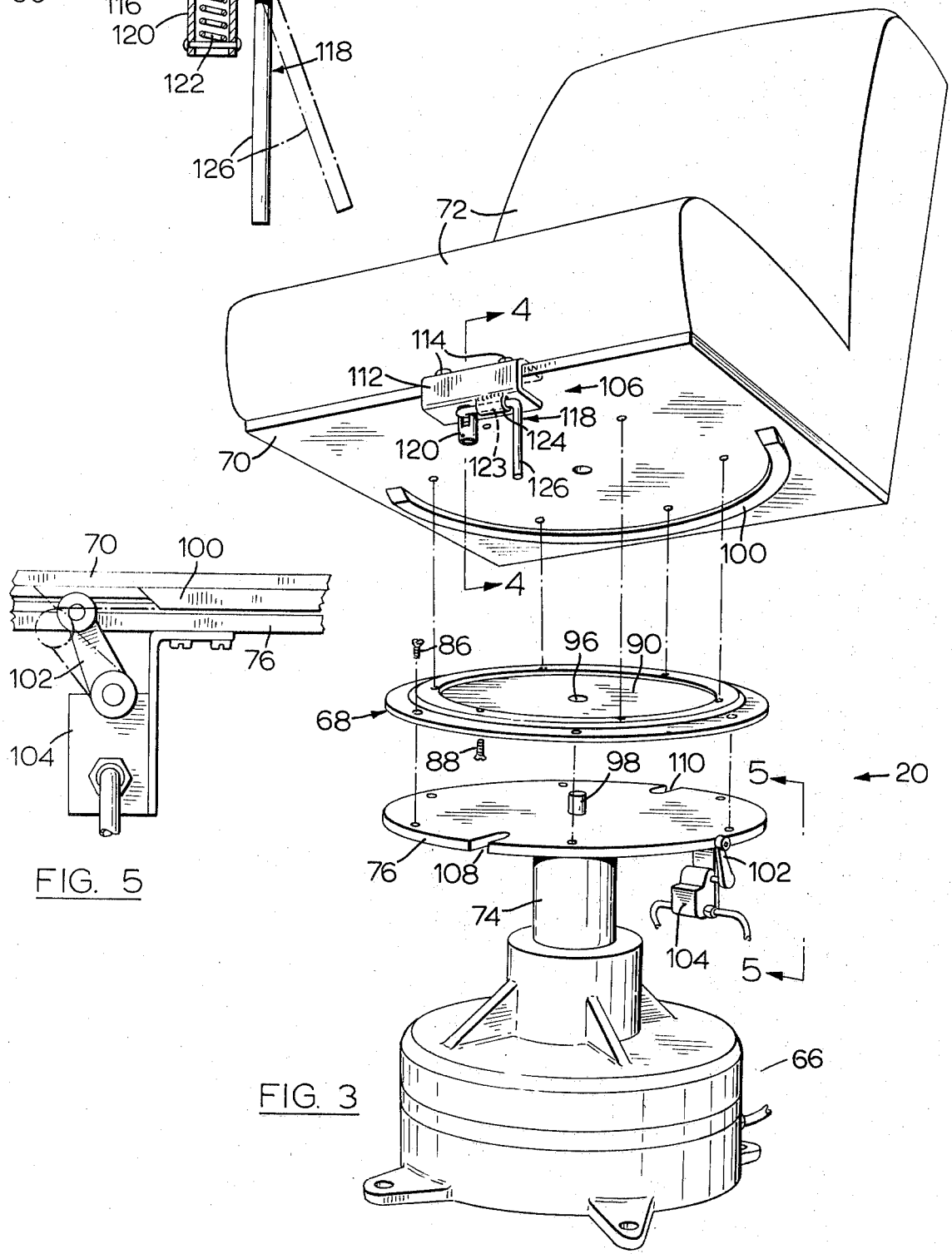

SHUNTING TRACTOR WITH SWIVEL SEAT AND AUTOMATIC REAR DOOR OPENER

This invention relates to a vehicle for shunting road trailers about terminal facilities and more particularly to the combination of a swivel seat in a cab, a cab door and means responsive to seat position for opening and closing the door automatically.

Road tractors are used to move trailers from one location to another and include fifth wheel assemblies to which trailers are releasably secured. The cost of a road tractor is such that it is preferable for economic reasons to have the tractor in use as much as possible. Consequently, when a trailer arrives at a terminal, the tractor is uncoupled for use in moving a further trailer to another terminal. Each terminal therefore may have many trailers for unloading and loading at the terminal facilities. In order to move these trailers within the terminal, it is common to use a shunting tractor built specifically for the purpose.

Shunting tractors include fifth wheel assemblies which can be raised into engagement with a trailer to lift the front end of the trailer off its support legs so that the tractor can then move the trailer about the terminal without collapsing the support legs. The operator first gets out of the driving cab, walks around the tractor to couple air hoses to the trailer for releasing the trailer brakes and then climbs back into his cab to move the trailer. This procedure must be repeated when uncoupling the trailer. It will be evident that the procedure is both time consuming and tiring.

It is an object of the present invention to limit the time and effort required to couple and uncouple a trailer and shunting tractor. Accordingly in one of its aspects the invention provides a cab for a shunting tractor and the like, the cab having a swivel seat and a rearward opening door adjacent a platform behind the cab, the seat and door being interconnected so that on movement of the seat from a forward-facing position into a rearward-facing position, the door opens automatically so that the operator can leave his cab to stand on the platform where he can connect hoses and the like to a trailer, the interconnection being operable upon returning the seat to the forward-facing position to close the door.

According to a further aspect of the present invention, a shunting tractor is provided for moving road trailers. The tractor has a chassis including a pair of steerable forward wheels and a pair of rear wheels, and propulsion means coupled to the rear wheels for driving the tractor. A driving cab is coupled to the chassis adjacent the front of the tractor and a fifth wheel is coupled to the chassis behind the cab by an adjustable support which is operable to move the fifth wheel between a stored position to permit the tractor to be positioned with the fifth wheel under a road trailer, and a raised position supporting and coupling the road trailer to the tractor. A swivel seat is mounted in the cab for rotation between a forward-facing first position and a rearward-facing second position and a cab door which is located at the rear of the cab adjacent a platform, is operably coupled to the seat. On moving the seat from the first to the second position the door opens to provide an operator with ready access onto the platform for coupling air services and the like to a trailer. The door returns to a closed position upon returning the seat to the first position.

These and other aspects of the invention will be better understood with reference to the drawings; in which:

FIG. 1 is a perspective view from the rear of a vehicle according to the invention;

FIG. 2 is a sectional plan view on lines 2—2 of FIG. 1;

FIG. 3 is an exploded perspective view of a seat used in the vehicle;

FIG. 4 is a sectional view on line 4—4 of FIG. 3;

FIG. 5 is a view of a pneumatic switch used to sense seat position;

Figure 6:
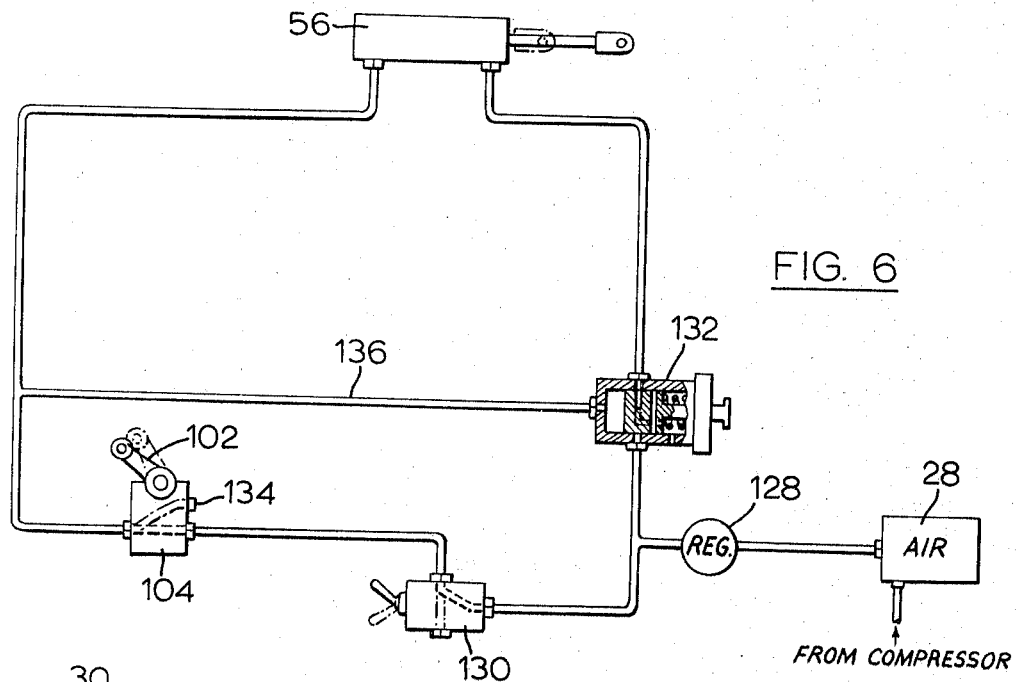
FIG. 6 is a diagrammatic representation of an air circuit associated with the seat.

Reference is made first to FIG. 1 which shows a shunting tractor 10 having a chassis 12 supported on a pair of steerable forward wheels 14 and a pair of rear wheels 16 (one of each pair being shown). A cab 18 is provided at a side of the tractor normally referred to as the driver's side and contains a swivel seat 20. Access to the cab is provided through a bi-fold door 22 at the rear of the cab, and as will be described, the seat and door are coupled by a pneumatic circuit so that the door is made to open when the seat is swivelled from a forward-facing or first position into a rearward-facing or second position shown in FIG. 1.

A fifth wheel 24 is coupled to the chassis by a conventional mechanism 25 for raising the fifth wheel into the position shown in ghost outline. In this position the fifth wheel would be coupled to a trailer (not shown) for moving the trailer about terminal facilities. The vehicle is powered by a motor within a cover 26 adjacent the cab 18, and a compressor is also contained within the cover. The compressor is adapted to maintain a predetermined head of compressed air in a reservoir 28 on the chassis 12.

Air from the reservoir 28 is available at brake cylinders 30 (one of which is shown) associated with rear wheels 16, and to the aforementioned pneumatic circuit for opening the door 22. Air is also available at flexible hoses 32, 34 supported on a staff 36 adjacent the cab 18 and having conventional couplers at their respective distal ends for snap connection to a trailer. The couplers are contained in protective pots 38, 40 when not in use. A platform 42 behind the cab 18 supports the operator when he leaves his cab to connect the conduits to the trailer once the trailer has been coupled to the fifth wheel 24.

The method of operation of the shunting tractor will be more fully described with reference to FIGS. 6 and 7. However, before describing this operation, details of the structure associated with the door and seat will be described with reference to FIGS. 2 to 5 inclusive.

As seen in FIG. 2, the door 22 is hingeably mounted on an upright post 44 of the cab 18. The door is of the bi-fold type and consists of two leaves 46, 48 connected by a hinge 50 and guided at the distal edge of leaf 48 in respective top and bottom tracks 52, 54 (FIG. 1) mounted in the door opening.

A double-acting pneumatic actuator 56 is pivotally connected to a bracket 58 at the top of door leaf 46 and to a similar smaller bracket 60 mounted on a cab side wall 62. In FIG. 2, the actuator is extended and the door is in a substantially open position. When the actuator is contracted the door is moved into a closed position shown in ghost outline. A pneumatically operated plunger 63 is attached to the lower extremity of leaf 46 adjacent the hinge 50 in an opening 65 in the floor of the cab to lock the door in the open position. Circuit controlling the actuator 56 and plunger 63 will be described with reference to FIGS. 6 and 7.

Reference is now made to FIG. 3 which shows the seat 20 in the position it would occupy when the operator is driving the tractor. The seat consists of a support 66, bearing 68 for permitting the seat to swivel, seat mounting plate 70, and cushions 72. Support 66 which is of a type made by the Anchorlok Division of Royal Industries, California, U.S.A. and sold under the trade mark Royal-Ride includes an air cushion under a tube 74. A support plate 76 is mounted at the top of the tube 74 for vertical movement to absorb shocks.

As seen in FIGS. 3 and 4, the bearing 68 consists of a lower ring 78 and upper ring 80 defining annular tracks containing ball bearings 82. The lower ring 78 is attached by screws 86 to the support plate 76 and counter-sunk screws 88 pass through a retainer plate 90 and through the upper ring 80 before entering seat mounting plate 70. The retainer plate 90 includes an annular lip 92 engaged below a corresponding lip 94 on the lower ring 78 to prevent separation of the rings. Plate 90 also ensures that the bearing 68 is concentric with the support plate 76 by virtue of an opening 96 in the retainer plate 90 for engaging over a suitable projection 98 associated with support 66. This projection also engages an opening in the mounting plate 70 to similarly locate the plate 70 relative to the support 66.

As also seen in FIG. 3, a semi-circular cam 100 in the form of a raised rib is provided on the underside of the seat mounting plate 70. The cam is concentric with the bearing 68 and positioned radially outside the bearing. On assembly, the cam 100 is in position to combine with a cam follower 102 associated with a pneumatic switch 104 coupled to the underside of the support plate 76.

The seat is positioned in the cab such that the operator can swivel the seat in one direction only from the forward-facing or first position shown in FIG. 3. With the seat in this position the cam follower is in a normal position as shown in full outline in FIG. 5. As the seat swivels, the cam follower is deflected into the ghost-outline position shown in FIG. 5 by the cam 100 which has a length sufficient to ensure that after the seat has been rotated through 180 degrees, the cam follower continues to be deflected by the cam.

A latch 106 is attached to the seat mounting plate 70 for engagement in respective recesses 108, 110 in the support plate 76. These recesses are spaced 180 degrees apart with respect to the axis of rotation of the support plate 76. As seen in FIG. 4, the latch 106 consists of a channel member 112 engaged about a forward edge of the mounting plate 70 and held in place by fasteners 114. On assembly the support plate 76 rotates within the channel member 112 so that an inner end portion 116 of a latch lever 118 is available for engagement in respective recesses 108, 110 in the support plate 76. A spring housing 120 extends downwardly from the underside of the member 112 and contains a compression spring 122 which biasses the lever end portion 116 into engagement with the support plate 76 so that when the end portion 116 is in alignment with one of the recesses 108, 110 the end portion automatically enters the respective recess to locate the seat in one of the forward-facing or rearward-facing positions.

The lever 118 includes a central portion 122 extending horizontally and journalled in a tube 124 welded to the underside of channel member 112. The central portion connects the end portion 116 to a downwardly-extending handle 126 whereby the operator can rotate the lever 118 to disengage the end portion from the respective recesses 108, 110 when he is about to swivel the seat.

Reference is now made to FIGS. 1 to 6 and more particularly to FIG. 6 to describe the air circuit associated with the door 22 and seat 20. Air is available from reservoir 28 and after passing through a pressure regulator 128 is directed to both a manual switch 130 and a spool valve 132. In the position shown, air from the regulator 128 passes through the switch 130 and then through pneumatic switch 104 on its way to actuator 56 to open the door. The seat is in the rearward-facing position shown in FIG. 1 at this time and the cam follower 102 is deflected into the position shown in ghost-outline in FIG. 5 and in solid outline in FIG. 6.

When the operator returns the seat to the forward-facing position, the cam follower 102 passes over the end of the cam 100 and then takes up the normal position shown in ghost-outline in FIG. 6. As a result air from switch 130 can no longer pass through switch 104 and air from the system between switch 104 and actuator 56 can bleed to atmosphere through outlet 134 in switch 104. Also, air which is supplied through line 136 to maintain spool valve 132 in a deflected position can bleed to atmosphere so that the spring-loaded spool can return to a normal position. With tje spool in the deflected position air can not pass from the regulator through valve 132 to the actuator 56 and air in the actuator 56 can bleed through the spool valve to atmosphere. As soon as air bleeds from line 136, the spring-loaded spool returns to its normal position in which the actuator 56 is connected pneumatically to regulator 128. Consequently the actuator then closes the door at the same time displacing air through outlet 134 in valve 104. The seat is then in the forward-facing position shown in FIG. 3. Upon returning the seat towards the rearward-facing position, the cam follower 102 returns to the deflected position and air enters line 136 thereby deflecting the spool of valve 132 into the position shown. Next, the actuator opens the door thereby simultaneously expelling air to atmosphere through the spool valve 132.

The switch 130 is located outside the cab 18 in a convenient position such as under the engine cover 26 where it is not readily accessible. The switch is used when shutting down the tractor and again when starting up. As drawn the switch is shown in the position it occupies when the tractor is in use. When shutting down, the operator leaves the tractor and the door is open. He then moves the switch into the position shown in ghost-outline thereby closing the air supply to valve 104 and permitting air to bleed to atmosphere from line 136. Accordingly the spool valve moves into the normal position and air is available at the actuator to close the door. On returning the switch to the position shown in FIG. 6, the line 136 carries air to move the spool and the actuator again opens the door.

Figure 7:
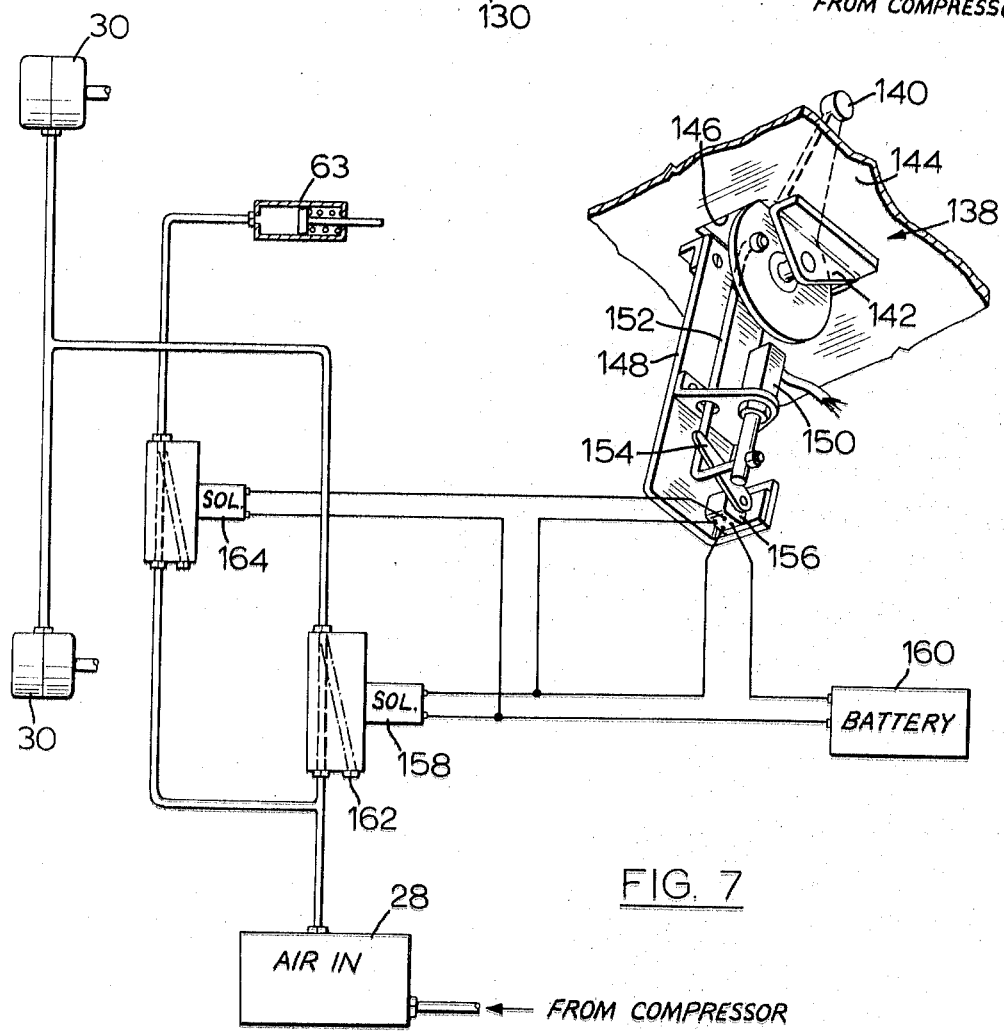
FIG. 7 is a perspective view of a gear shift control used in the vehicle and associated with brake and door-locking circuits shown diagrammatically.

Reference is now made to FIG. 7 to describe a gear change mechanism 138 (also seen in the cab in FIG. 1). This mechanism consists of a change lever 140 rotatably mounted on a bracket 142 below the tractor dashboard 144. The bracket 142 borders one side of an opening 146 through which the lever 140 projects and at its opposite side, the opening is bordered by an elongated bracket 148. An electrically connected gear switch 150 is fixedly coupled to the bracket 148 and operably coupled by a connecting rod 152 to the lever 140. Movement of the lever is sensed by the switch 150 to select gears for driving the vehicle.

The connecting rod 152 engages a downwardly biassed arm 154 of an electrical switch 156 mounted on bracket 148. With the lever 140 in 'neutral' a solenoid 158 is electrically connected to battery 160 so that air from reservoir 28 is available at the brake cylinders 30 to lock the rear wheels 16 (FIG. 1). Upon moving the lever 140 from 'neutral' into a drive position the solenoid is de-energized and then the cylinders 30 can exhaust to atmosphere through a port 162. Once in drive a second electrical circuit is energized by switch 156 so that associated solenoid 164 is energized and air passes to plunger 63 to lock the door 22 (FIG. 1). It will be appreciated that the operator will have turned the seat into the forward-facing position ready to drive the vehicle before he puts the vehicle into gear. The door will therefore be closed before the plunger 63 is energized to engage the plunger in opening 65 (FIG. 2). Also before leaving the cab the operator will place the gear lever in neutral thereby de-energizing solenoid 164 to release the spring-loaded plunger and to energize solenoid 158 thereby applying the brakes to rear wheels 16 (FIG. 1).

When an operator is to move a trailer, he reverses the shunting tractor into a position in which the fifth wheel 24 can be elevated by the mechanism 25 into engagement with the trailer. He then places the gear lever 140 (FIG. 7) into neutral thereby releasing door plunger 63 (FIG. 2) and applying the brakes. Next, after rotating latch handle 126 (FIG. 4) upwardly to release the latch 106, he swivels the seat from the forward-facing position towards the rearward-facing position. As soon as the seat begins to swivel he can release handle 126 which will then permit the latch end portion 116 to locate automatically in support plate recess 110 (FIG. 3) when the seat reaches the rearward-facing position. As previously described, this swivelling movement results in the door opening so that the operator can then stand up on the platform 42 where he can reach the air hoses 32, 34 and couple them to the trailer air system for disengaging the trailer brakes. The operator then returns to his cab and reverses the procedure so that when he is ready to drive the tractor, the trailer and tractor brakes are off, the cab door is locked closed and the leading end of the trailer is elevated by and coupled to the fifth wheel.

It will be evident that the form of the shunting tractor can be modified without departing from the inventive concept, for instance it may be preferable in some situations to provide that the seat swivel in the other direction from that described in which case the cam 100 (FIG. 3) would be modified accordingly. Similarly in countries where the steering would be on the right of the vehicle rather than on the left as drawn, the cab and associated parts would be on the other side of the vehicle. Such changes are within the scope of the present invention.

What I claim is:

1. For use in a shunting tractor and the like having a chassis including a pair of steerable forward wheels and a pair of rear wheels, propulsion means operable to drive the vehicles and a cab coupled to the chassis adjacent the front of the vehicle, the cab having a rearwardly opening doorway and containing vehicle drive controls; the improvement comprising the combination of a swivel seat mounted in the cab for rotation between a forward-facing first position and a rearward-facing second position; a cab door positioned in the doorway opening at the rear of the cab, the seat including a support and latch means adapted to combine with the support to locate the seat selectively in said first and second positions; actuator means coupled to the door; switch means responsive to the position of the seat and operably coupled to the actuator whereby movement of the seat from the first to the second position results in the door being opened by the actuator and whereby movement from the second to the first position results in the door being closed by the actuator.

2. Apparatus as claimed in claim 1 in which the door is a bi-fold door comprising a first leaf hinged to a cab door post and a second leaf hinged to the first leaf, the shunting tractor further comprising upper and lower tracks coupled to the cab respectively above and below the door and in which the door further comprises guide means coupled to the second leaf adjacent an outer edge thereof and engaged in the tracks for locating the second leaf as the door moves between open and closed positions.

3. Apparatus as claimed in claim 1 in which the support includes a support plate and in which the seat further comprises a bearing coupled to the support plate, a mounting plate coupled to the bearing for rotation relative to the support and seat cushions attached to the mounting plate for movement therewith, the latch means being attached to the mounting plate and the support plate including means co-operable with the latch means to locate the mounting plate in two positions spaced 180 degrees apart and corresponding to the said first and second seat positions.

4. Apparatus as claimed in claim 3 in which the switch means comprises a cam attached to the underside of the mounting plate, and a cam follower and associated pneumatic switch attached to the support plate such that the cam follower is in one of a normal and a deflected position with the seat in said first position and in the other of the normal and deflected positions with the seat in said second position.

5. A shunting tractor for use in moving road trailers, the vehicle comprising: a chassis having a pair of steerable forward wheels and a pair of rear wheels; propulsion means operable to drive the vehicle; a cab coupled to the chassis adjacent the front of the vehicle, the cab having a rearwardly opening doorway and housing vehicle drive controls; a fifth wheel; means supporting the fifth wheel on the chassis rearward of the cab for movement between a stored position which permits the vehicle to be positioned with the fifth wheel under a said road trailer and a raised position supporting and coupling the road trailer for moving the road trailer about the terminal; a swivel seat mounted in the cab for rotation between a forward-facing first position and a rearward-facing second position; a cab door positioned at the rear of the cab facing towards the fifth wheel; the seat including a support and latch means adapted to combine with the support to locate the seat selectively in said first and second positions; actuator means coupled to the door; switch means responsive to the position of the seat and operably coupled to the actuator whereby movement of the seat from the first to the second position results in the door being opened by the actuator and whereby movement from the second to the first position results in the door being closed by the actuator; and a platform on the chassis between the cab and the fifth wheel to support an operator when connecting air services and the like to the trailer.

6. A shunting tractor as claimed in claim 5 in which the actuator means and the switch means are coupled pneumatically by an air circuit, and in which the tractor further comprises an air compressor and an air reservoir for receiving compressed air from the compressor and coupled to the air circuit for supplying compressed air to the actuator and to the switch means.

7. A shunting tractor as claimed in claim 5 in which the door is a bi-fold door comprising a first leaf hinged to a cab door post and a second leaf hinged to the first leaf, the shunting tractor further comprising upper and lower tracks coupled to the cab respectively above and below the door and in which the door further comprises guide means coupled to the second leaf adjacent an outer edge thereof and engaged in the tracks for locating the second leaf as the door moves between open and closed positions.

8. A shunting tractor as claimed in claim 5 in which the support includes a support plate and in which the seat further comprises a bearing coupled to the support plate, a mounting plate coupled to the bearing for rotation relative to the support and seat cushions attached to the mounting plate for movement therewith, the latch means being attached to the mounting plate and the support plate including means co-operable with the latch means to locate the mounting plate in two positions spaced 180 degrees apart and corresponding to the said first and second seat positions.

9. A shunting tractor as claimed in claim 8 in which the switch means comprises a cam attached to the underside of the mounting plate, and a cam follower and associated pneumatic switch attached to the support plate such that the cam follower is in one of a normal and a deflected position with the seat in said first position, and in the other of the normal and deflected positions with the seat in said second position.

10. A shunting tractor as claimed in claim 5 and further comprising: a gear shift operably coupled to the propulsion means, the gear shift having a plurality of drive positions in which the propulsion means is coupled to the wheels for moving the tractor and a neutral position in which the propulsion means is disengaged from the wheels to permit the propulsion means to idle when the tractor is stationary; a brake system coupled to the gear shift and to the rear wheels and operable upon placing the gear shift in the neutral position to apply the brakes at the rear wheels.

11. A shunting tractor as claimed in claim 10 and further comprising a plunger coupled to the door and operable to engage an opening in the cab to lock the door in the closed position, and means operably coupling the plunger to the gear shift so that the plunger is released when the gear shift is in said neutral position and engaged when the gear shift is in said drive position.

12. A shunting tractor as claimed in claim 10 in which the actuator means and the switch means are coupled pneumatically by an air circuit, and in which the tractor further comprises an air compressor and an air reservoir for receiving compressed air from the compressor and coupled to the air circuit for supplying compressed air to the actuator and to the switch means.

13. A shunting tractor as claimed in claim 12 in which the door is a bi-fold door comprising a first leaf hinged to a cab door post and a second leaf hinged to the first leaf, and the shunting tractor further comprising upper and lower tracks coupled to the cab respectively above and below the door and in which the door further comprises guide means coupled to the second leaf adjacent an outer edge thereof and engaged in the tracks for locating the second leaf as the door moves between open and closed positions.

* * * * *